(12) United States Patent
Newcomer (10) Patent No.: US 8,607,822 B2
(45) Date of Patent: Dec. 17, 2013

(54) HEATING AND AIR CONDITIONING SYSTEM

(75) Inventor: Douglas A. Newcomer, New Market, MD (US)

(73) Assignee: X-Changer, LLC., Stevensville, MD (US)

( * ) Notice: Subject to any disclaimer, the term of this patent is extended or adjusted under 35 U.S.C. 154(b) by 8 days.

(21) Appl. No.: 13/212,751

(22) Filed: Aug. 18, 2011

(65) Prior Publication Data
US 2011/0297348 A1 Dec. 8, 2011

Related U.S. Application Data

(63) Continuation of application No. 12/397,645, filed on Mar. 4, 2009, now abandoned.

(60) Provisional application No. 61/136,634, filed on Sep. 22, 2008.

(51) Int. Cl.
*F16K 11/052* (2006.01)

(52) U.S. Cl.
USPC ........................................ 137/625.43; 62/325

(58) Field of Classification Search
USPC .................. 137/625.43, 625.44, 625.46, 875; 62/325
See application file for complete search history.

(56) References Cited

U.S. PATENT DOCUMENTS

| | | |
|---|---|---|
| 2,286,115 A | 6/1942 | Shelton |
| 3,747,671 A | 7/1973 | Schwitzer |
| 3,980,127 A | 9/1976 | Sacks |
| 3,995,446 A | 12/1976 | Eurbank |
| 4,039,124 A | 8/1977 | Ginn |
| 4,062,400 A | 12/1977 | Horowitz |
| 4,124,998 A | 11/1978 | Swiderski |
| 4,129,116 A | 12/1978 | Kent |
| 4,182,401 A | 1/1980 | Pinnell et al. |
| 4,203,469 A * | 5/1980 | Gates ...................... 137/625.43 |
| 4,230,174 A | 10/1980 | Eubank |
| 4,373,576 A | 2/1983 | Strupczewski |

(Continued)

FOREIGN PATENT DOCUMENTS

| | | |
|---|---|---|
| JP | 59-071938 | 4/1984 |
| JP | 60-060437 | 4/1985 |

(Continued)

OTHER PUBLICATIONS

International Search Report for PCT/US2009/057280 dated Nov. 30, 2009.

(Continued)

*Primary Examiner* — John Fox
(74) *Attorney, Agent, or Firm* — Nixon & Vanderhye P.C.

(57) ABSTRACT

A heating and cooling system for a building utilizes lower vents which open into lower portions of rooms of a building, and upper vents which open into upper portions of rooms of the building. When the system is operating in a heating mode, heated air is delivered into the upper portions of the rooms through the upper vents and air is removed from the rooms through the lower vents. When the system is operating in a cooling mode, cool air is delivered into the rooms through the lower vents, and air is removed from the rooms through the upper vents. Operating the heating and cooling modes in this fashion provides the most efficient operation of the heating and cooling system.

22 Claims, 10 Drawing Sheets

(56) References Cited

U.S. PATENT DOCUMENTS

| | | |
|---|---|---|
| 4,498,526 A | 2/1985 | Arenas |
| 4,543,996 A * | 10/1985 | Baron ................ 137/625.43 |
| 4,779,671 A | 10/1988 | Dolison |
| 4,784,212 A | 11/1988 | Brimer et al. |
| 4,909,308 A | 3/1990 | Dreibelbis |
| 5,039,006 A | 8/1991 | Habeggar |
| 5,172,725 A * | 12/1992 | Kitagawa ............ 137/625.43 |
| 5,348,077 A | 9/1994 | Hillman |
| D397,202 S | 8/1998 | Saar |
| 6,058,974 A * | 5/2000 | Blomgren .......... 137/625.43 |
| 7,117,882 B2 * | 10/2006 | Blomgren ................ 137/311 |
| 7,156,316 B2 | 1/2007 | Kates |
| 7,228,709 B2 | 6/2007 | Hwang |
| 7,250,000 B2 | 7/2007 | Daniels, II |
| 7,434,608 B2 | 10/2008 | Shindo et al. |
| 8,210,205 B2 * | 7/2012 | Michaels ............ 137/625.46 |
| 2008/0142610 A1 | 6/2008 | Bastow |
| 2008/0164006 A1 | 7/2008 | Karamanos |
| 2008/0245353 A1 | 10/2008 | Schreiber |

FOREIGN PATENT DOCUMENTS

| | | |
|---|---|---|
| JP | 03-013746 | 1/1991 |
| JP | 03-152321 | 6/1991 |
| JP | 03-207937 | 9/1991 |
| JP | 05-010579 | 1/1993 |
| JP | 05-280800 | 10/1993 |
| JP | 11-211125 | 8/1999 |
| JP | 2003-120958 | 4/2003 |

OTHER PUBLICATIONS

Written Opinion of the International Searching Authority dated Nov. 30, 2009.

* cited by examiner

HEATING AND AIR CONDITIONING SYSTEM

This application is a continuation of U.S. application Ser. No. 12/397,645, filed on Mar. 4, 2009, which itself claims priority to Provisional Application No. 61/136,634 filed Oct. 10, 2008, the entire contents of both of which are hereby incorporated by reference.

FIELD OF THE TECHNOLOGY

The disclosed technology is related to heating and cooling systems used to heat and cool rooms of a building.

BACKGROUND

Heating and cooling systems for buildings typically include a heating unit which produces heated air and a cooling unit which produces cool air. The hot or cool air is then delivered into rooms of a building through ducts and vents which open into the rooms. In addition, it is common to include air return vents and ducts which return air from one or more rooms of a building back to the heating unit or cooling unit. Thus, air is circulated from the heating and cooling unit, into the rooms, and then back to the heating and cooling unit.

The placement of the vents which deliver heated or cooled air into a room, and the placement of return vents which pull air back out of a room can vary depending on the building design. It is common to place such vents in the walls of a room, in the floor of a room, or in the ceiling of a room.

DETAILED DESCRIPTION OF PREFERRED EMBODIMENTS

Figure 1:
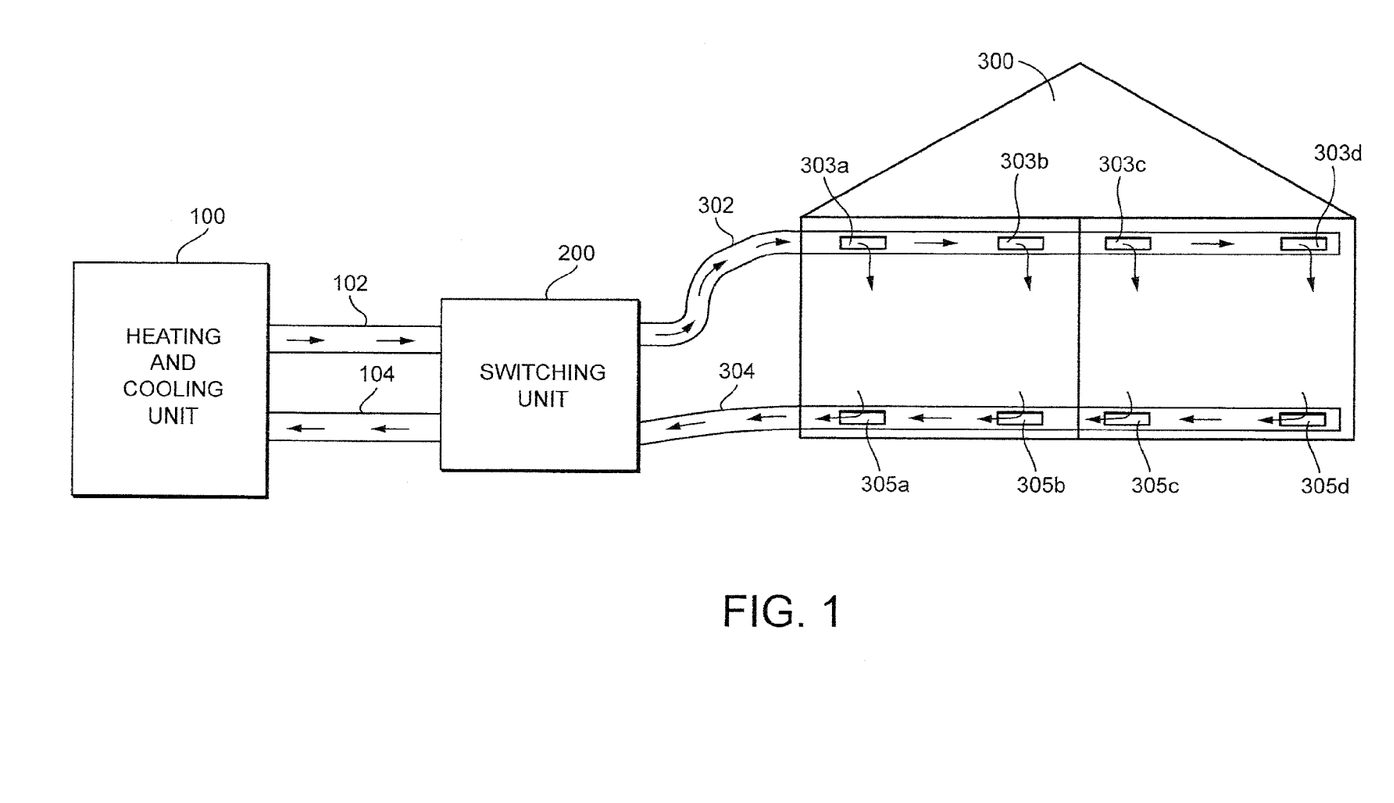
FIG. 1 is a diagram illustrating a heating and cooling system which is operating in a heating mode.

In a heating and cooling system embodying the invention, at least two vents are provided within a room of a building. An upper vent is positioned at an upper portion of the room, and a lower vent is positioned in a lower portion of the room. As shown in FIG. 1, the heating and cooling system would include a heating and cooling unit 100 which is connected to a switching unit 200.

The heating and cooling unit could take numerous different forms. It could be a traditional gas or electric furnace, paired with a traditional air conditioning unit. In other instances, it could be a heat pump. In other instances, it could take other forms. Regardless of the actual form of the device, it would be capable of delivering both heated air for heating rooms of a building, and cooled air for cooling rooms of a building. While certain sections of the following description refer to a heating and cooling unit, this term is meant to refer to any device or devices capable of delivering heated and/or cooled air.

The switching unit 200 would be connected to a first duct 302 which is connected to the upper vents that open into upper portions of the rooms of a building. The switching unit would also be connected to a lower duct 304 which is connected to lower vents 305*a*, 305*b*, 305*c*, 305*d* which open into lower portions of the rooms of a building 300.

Figure 2:
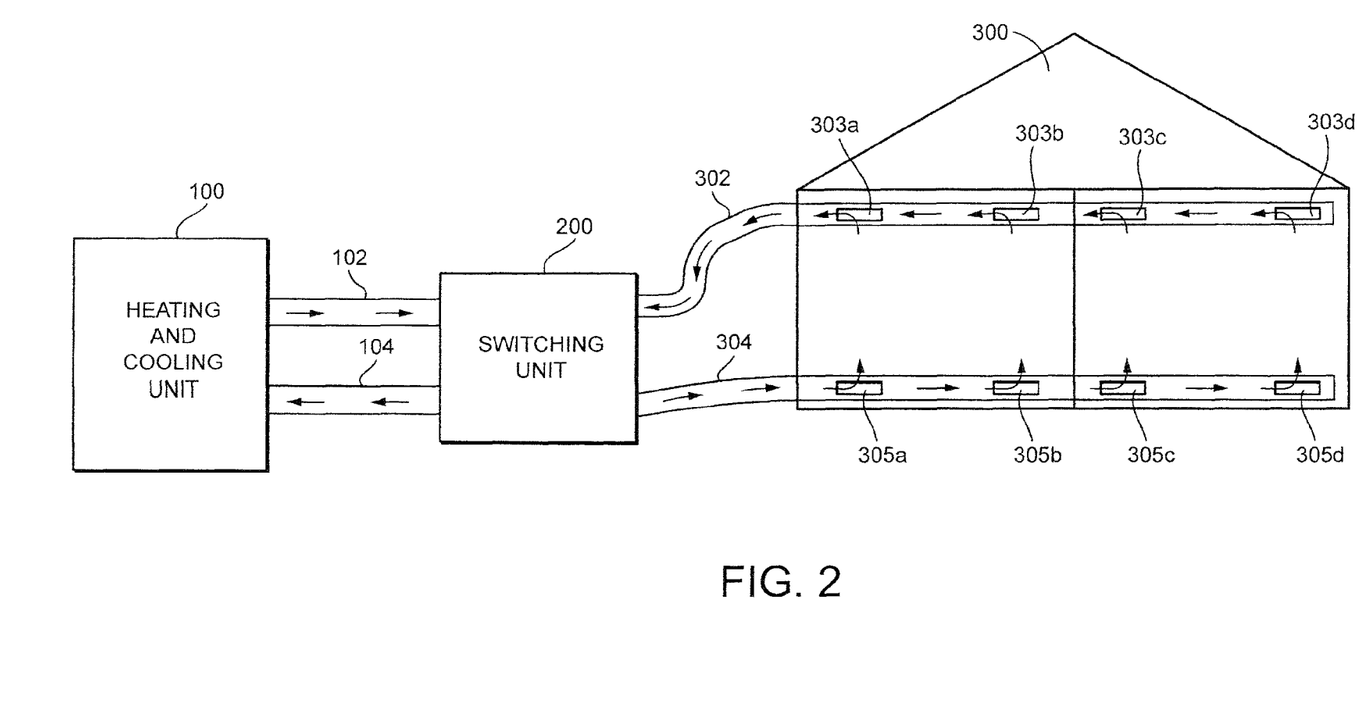
FIG. 2 is a diagram illustrating a heating and cooling system operating in a cooling mode.
Figure 3:
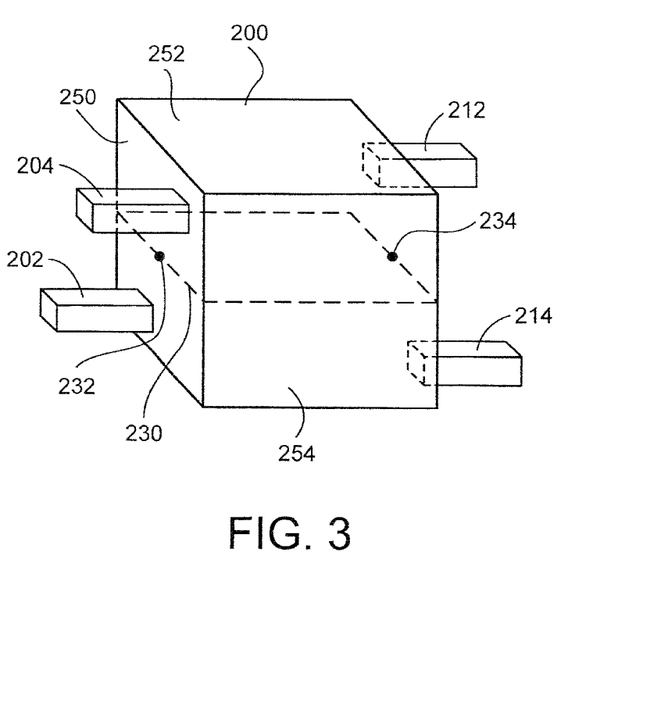
FIG. 3 is a perspective view of a switching unit for a heating and cooling system configured for a first operational mode.
Figure 4:
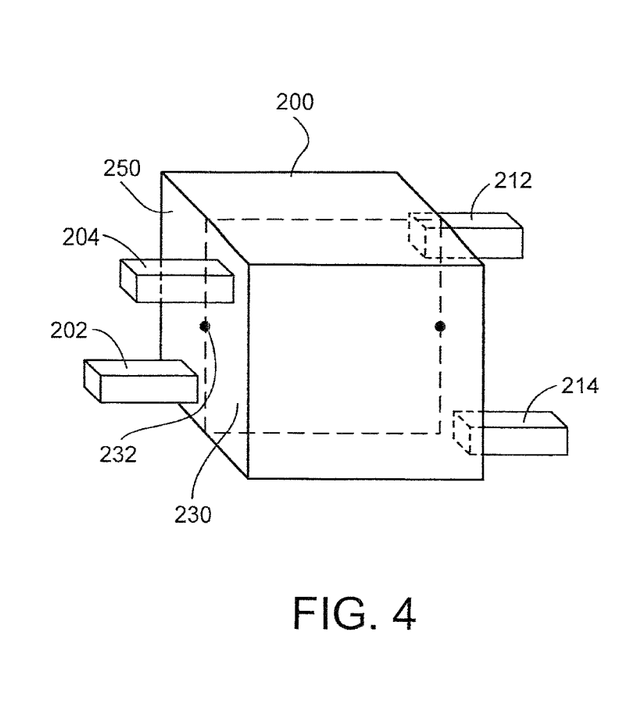
FIG. 4 is a perspective view of the switching unit configured in a second operational mode.

FIGS. 3 and 4 illustrate one embodiment of a switching unit 200 which can be used in the heating and cooling system illustrated in FIGS. 1 and 2. As shown in FIG. 3, the switching unit 200 includes an input port 204 which is attached to the upper right side of a front wall 250 of the switching unit 200. In addition, an output port 202 is provided in a lower left side of the front wall 250.

A first input/output (I/O) port 212 is provided on a rear face of the switching unit. In addition, a second I/O port 214 is also provided on the rear face of the switching unit. Note, the first I/O port 212 is located on the upper right side of the rear face of the switching unit, and the second I/O port 214 is provided on the lower left side of the rear face of the switching unit.

A rectangular switching plate 230 is rotatably mounted inside the switching unit 200. In the embodiment shown in FIG. 3, the switching plate 230 is mounted on two pivot points 232, 234 located on the front and rear faces of the switching unit. This allows the switching plate to rotate between a horizontal position, as shown in FIG. 3, and a vertical position, as shown in FIG. 4.

When the switching plate 230 is located in the horizontal position, as shown in FIG. 3, air entering the switching unit 200 through the input port 204 can be communicated to the first I/O port 212. Air entering the switching unit through the second I/O port 214 can be communicated to the output port 202.

When the switching plate 230 is rotated to the vertical position, as shown in FIG. 4, the connections are changed. As shown in FIG. 4, when the switching plate is oriented vertically, the air entering the input port 204 will be communicated to the second I/O port 214. Likewise, air entering the switching unit through the first I/O port 212 will be communicated to the output port 202.

The ability to change how the input port 204 and output port 202 of the switching unit are coupled to the two I/O ports 212, 214 makes it possible to change how heated and cooled air is delivered to and removed from the rooms of a building.

This capability also makes it possible to increase the efficiency of a typical heating and cooling system of a building.

FIG. 1 illustrates the heating and cooling system when it is operating in a heating mode. In other words, FIG. 1 shows the system when heated air is being delivered into the rooms of the building 300. As shown in FIG. 1, heated air from the heating and cooling unit 100 is delivered to an input port of the switching unit 200. The heated air is then communicated to an upper duct 302 which is connected to upper vents 303a, 303b, 303c, 303d located in the upper portions of the rooms of the building 300.

If the switching unit shown in FIGS. 3 and 4 were used in the heating and cooling systems shown in FIGS. 1 and 2, the output of the heating and cooling unit 100 would be connected to the input port 204 of the switching unit 200. Likewise, the output port 202 of the switching unit would be coupled to the input of the heating and cooling unit 100. The upper duct 302 would be coupled to the first I/O port 212, and the lower duct 304 would be coupled to the second I/O port 214.

When the system is operating in the heating mode, as illustrated in FIG. 1, the switching plate would be oriented horizontally, as shown in FIG. 3. As a result, the heated air delivered from the heating and air conditioning unit 100 to the input port 204 of the switching unit 200 would be communicated to the upper duct 302, which is coupled to the first I/O port 212. The heated air would be delivered to the upper portions of the rooms of the building via the upper vents 303a, 303b, 303c and 303d.

In addition, air would also be simultaneously removed through the lower vents 305a, 305b, 305c, 305d of the rooms of the building. The air removed from the rooms would be communicated through the lower duct 304 which is attached to the second I/O port 214 of the switching unit 200 shown in FIG. 3. The air removed from the rooms of the building would then exit the switching unit 200 through the output port 202, and the air would be communicated through an output duct 104 back to the heating and cooling unit 100. The air returned to the heating and air conditioning unit 100 through the output duct 104 would then be heated and sent back to the switching unit 200 through duct 102.

FIG. 2 illustrates the same system operating in a cooling mode. In the cooling mode, the heating and cooling unit 100 would be supplying cooled air to the switching unit 200 through the duct 102. The switching unit would be configured as shown in FIG. 4, where the switching plate 230 is oriented vertically. As a result, the cooled air delivered into the input port 204 of the switching unit 200 would be delivered to the second I/O port 214. The second I/O port 214, which is connected to the lower duct 304, would ensure that the cooled air is then delivered to the lower portions of the rooms of the building 300 through the lower vents 305a, 305b, 305c, 305d.

At the same time, air would be removed from the rooms of the building through the upper vents 303a, 303b, 303c, 303d. The air removed from the upper portions of the rooms would travel along the upper duct 302 to the first I/O port 212 of the switching unit 200. Because the switching plate 230 is oriented vertically, as shown in FIG. 4, the air removed from the rooms of the building entering the switching unit 200 through the first I/.O port 212 would then be communicated to the output port 202 of the switching unit 200. The air removed from the rooms of the building would then be sent through the duct 104 back to the heating and cooling unit 100. The air received back from the rooms of the building would then be cooled and sent back to the switching unit 200 through the duct 102.

When a heating and cooling system is configured as illustrated in FIGS. 1 and 2, it is possible to operate the system in two different modes. In the heating mode, as shown in FIG. 1, the heated air is delivered to the upper portions of the rooms through the upper vents, and air is removed from the rooms through the lower vents. Conversely, when the system is operating in a cooling mode, as shown in FIG. 2, cooled air is delivered to the lower portions of the rooms through the lower vents, and air is removed from the rooms through the upper vents.

The coolest air within the rooms would be located in the lower portions of the rooms. As a result, when the heating and cooling system is operating in the heating mode, the coolest air within the rooms will be sucked into the lower vents and returned back to the heating and air conditioning unit so that it can be reheated. The flow pattern within the room would be from the top to the bottom of the room. And because the warmer air would normally be located at the upper portions of the room, this air flow pattern will help to better distribute the heated air down to the lower portions of the room.

Conversely, when the system is operating in the cooling mode, as shown in FIG. 2, the cooled air is first delivered to the lower portions of the room, and air is removed from the upper portions of the room. Again, the warmest air within the room will be located in the upper portions of the room. By removing the warmer air from the upper portions of the room, the warmest air in the room will be removed first. In addition, the flow pattern for the air within the room will be from the bottom to the top. This helps to distribute the relatively cooler air from the bottom of the room into the upper portions of the room.

It is believed by the inventor that operating the heating and cooling system in these two different heating and cooling modes will result in the most efficient heating and cooling of the rooms of the building. Operating in this fashion will also ensure that in the heating mode, heated air is redistributed to the coolest portions of the room in a more effective fashion, and in the cooling mode, cooled air will be redistributed to the warmest portions of the room in the most efficient fashion.

Figure 5:
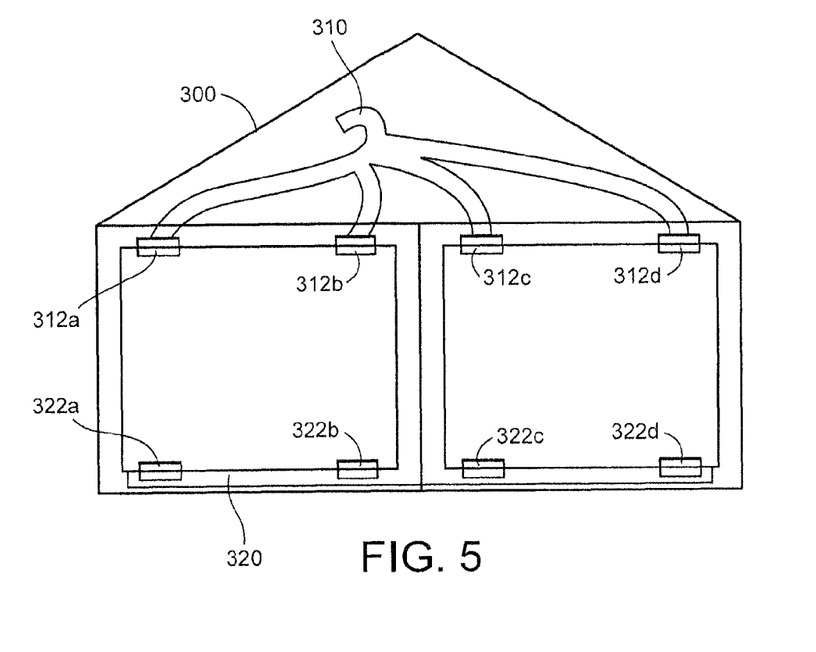
FIG. 5 is a diagram of the placement of vents in the rooms of a building.

The actual locations of the upper and lower vents can vary from one installation to another. As shown in FIG. 5, in some instances the lower vents 322a, 322b, 322c, 322d can be located within the floor of the rooms of the building 300. The lower ducts may be coupled to a lower duct 320 running underneath the floor of the building. Likewise, the upper vents 312a, 312b, 312c, 312d could be located within the ceiling of the building. The upper vents could be attached to an upper duct 310 which runs through the ceiling or possibly in the attic of the building.

Figure 6:
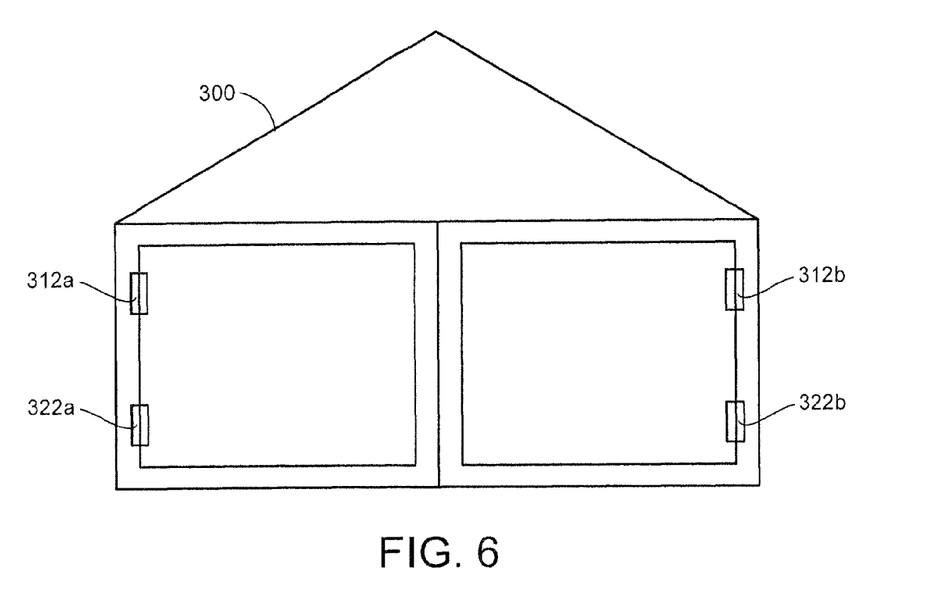
FIG. 6 is a diagram illustrating an alternate placement of vents within the rooms of a building.

In alternate instances, as shown in FIG. 6, the upper vents 312a, 312b could be located in walls of the rooms. Likewise, the lower vents 322a, 322b could also be located within the walls of the rooms. In still other instances, the upper vents could be located in a ceiling, while the lower vents are located in either the walls or the floor of a room. Likewise, the lower vents could be located in the floor, whereas the upper vents are located in the walls of the rooms.

The actual locations of the upper and lower vents is somewhat unimportant so long as the lower vents are located in a lower portion of a room, and the upper vents are located in an upper portion of a room.

In the switching unit illustrated in FIGS. 3 and 4, the input port 204 and output port 202 are formed on a front wall of the switching unit, whereas the first I/O port 212 and the second I/O port 214 are located on an opposite rear wall of the switching unit. In alternate embodiments, it would be possible to move the first and second I/O ports and/or the input port and output port to different locations.

Figure 7:
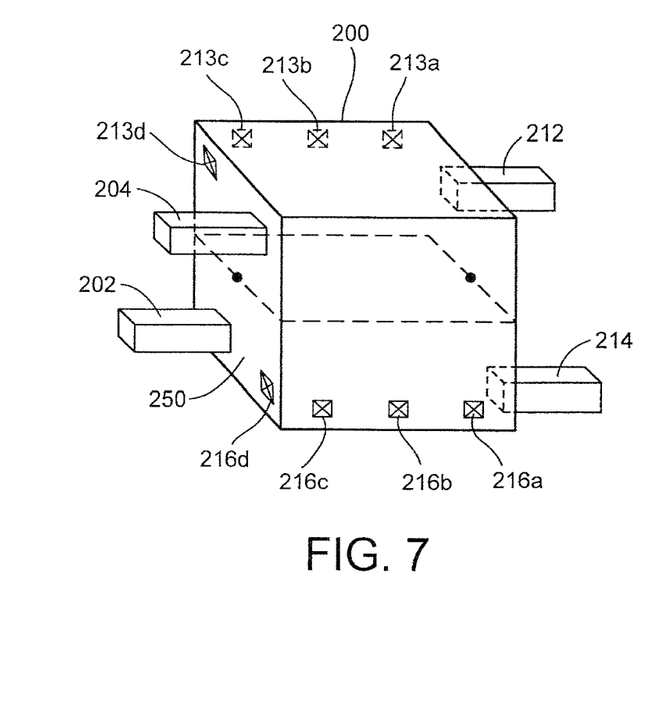
FIG. 7 is a perspective view of a switching unit which includes multiple potential I/O ports configured in a first operational mode.
Figure 8:
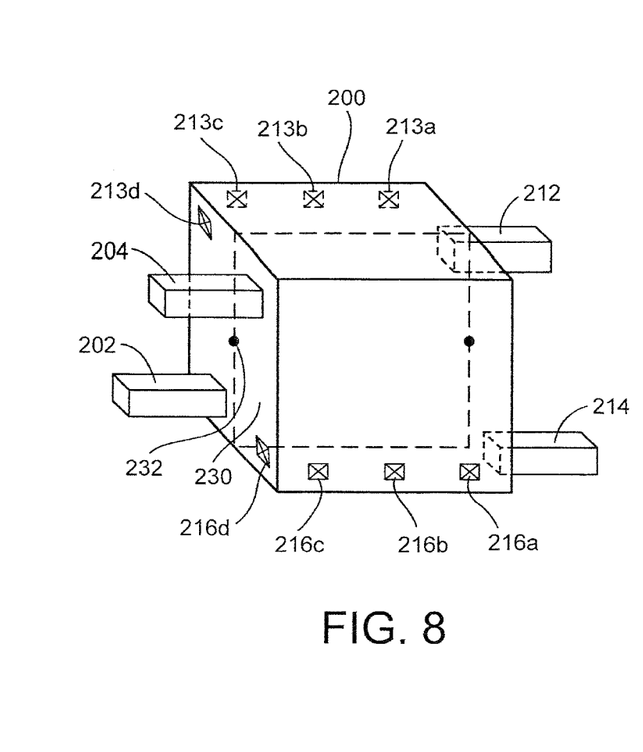
FIG. 8 is a perspective view of the switching unit in FIG. 7 configured in a second operational mode.

FIGS. 7 and 8 illustrate a switching unit which is similar to the one shown in FIGS. 3 and 4. In FIGS. 7 and 8, the input port 204 and the output port 202 are still located on a front wall 250 of the switching unit. However, FIGS. 7 and 8 illustrate a plurality of alternate locations for the first I/O port and the second I/O port. As shown therein, the first I/O port 212 could also be located at the positions identified with reference numerals 213a, 213b, 213c, and 213d. Likewise, the second I/O port 214 could be located at the alternate locations identified with reference numerals 216a, 216b, 216c, and 216d.

FIG. 7 depicts the switching unit 200 where the switching plate 230 is oriented horizontally. As a result, the input port 204 will deliver air to the first I/O port 212. However, if the first I/O port 212 were moved to one of the alternate locations 213a, 213b, 213c and 213d, air entering through the input port 204 would be delivered to the first I/O port at any of these alternate locations.

Air entering the switching unit through the second I/O port 214 would be communicated to the output port 202. And if the second I/O port 214 were moved to one of the alternate locates 216a, 216b, 216c, 216d, the air entering the switching unit through any of these alternate locations would still be communicated to the output port 202.

FIG. 8 shows the switching unit after the switching plate 230 has been oriented to a vertical position. As a result, air entering the switching unit 200 through the input port 204 would be communicated to the second I/O port 214, or to any of the alternate locations 216a, 216b, 216c, 216d. Likewise, air entering the switching unit through the first I/O port 212 would be communicated to the output port 202 regardless of whether it enters through the rear face of the switching unit or through one of the alternate locations 213a, 213b, 213c, 213d.

FIGS. 7 and 8 illustrate that the first and second I/O ports can be moved to different locations on the switching unit 200 while still preserving the same basic functionality of the sidewalls switching unit. The first and second I/O ports could also be moved to selected locations on the top and bottom surfaces. However, the input port 204 and the output port 202 can also be moved to different locations on the switching unit without altering the basic functionality of the switching unit.

Depending on where the switching unit is installed in a building, and depending upon the ducting arrangement required for the installation, it may be advantageous to attach the first and second I/O ports to one of the alternate locations on the switching unit. Likewise, it may be advantageous to move the input port and the output port to an alternate location. Moving the first and second I/O ports and/or the input port and output port to an alternate location might result in a small decrease in the efficiency of the switching unit, due to air flow losses. However, locating one of the I/O ports or the input port or output port at an alternate location may be necessary to accommodate the particular arrangement within the building.

Figure 9:
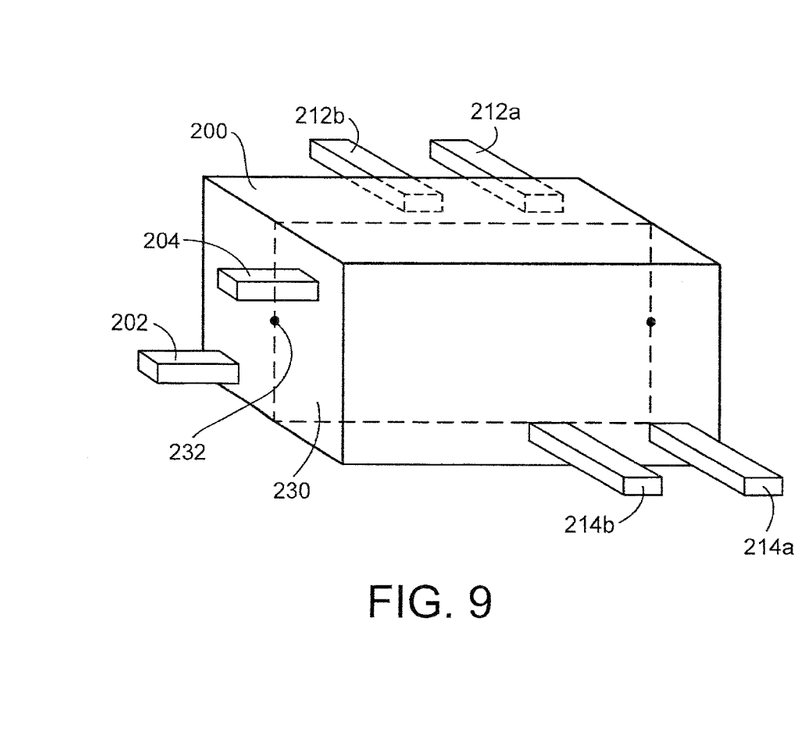
FIG. 9 is a perspective view of a switching unit which includes multiple input and output ports.

In addition, in the embodiments shown in FIGS. 3, 4, 7 and 8, only a single duct is shown attached to the first I/O port, and only a single duct is attached to the second I/O port. In alternate embodiments, as shown in FIG. 9, a plurality of ducts may act as I/O ports. In the embodiment shown in FIG. 9, the first I/O port has been replaced with two first I/O ports 212a, 212b located on a side face of the switching unit (the alternate locations). Likewise, the second I/O port 214 has been replaced with two second I/O ports 214a, 214b located on another side face of the switching unit (the alternate locations).

Similarly, the embodiments shown in FIGS. 1-4, 7 and 8, show only a single duct attached to the input port 204, and only a single duct attached to the output port 202. In alternate embodiments, multiple ducts could deliver heated and cooled air from the heating and cooling unit 100 to the switching unit 200, and the multiple ducts could be attached to switching unit at multiple locations. Likewise, multiple ducts could deliver air returning from the rooms from the switching unit 200 to the heating and cooling unit, and the multiple ducts could be attached to switching unit at multiple locations. Further, in some embodiments, multiple ducts might deliver heated and cooled air from the heating and cooling unit to the switching unit, while only a single duct delivers return air from the switching unit to the heating and cooling unit, and vice versa.

As noted above, the rectangular or square switching plate 230 within the switching unit is rotatably mounted on two pivot points 232, 234. In some embodiments, the user might manually rotate the switching plate 203 between the horizontal and vertical orientations using a lever or knob attached to the switching plate in order to switch the system from the heating to the cooling mode, or vice versa. Some type of locking system could also be provided to lock the switching plate in either the horizontal or vertical position.

Figure 10:
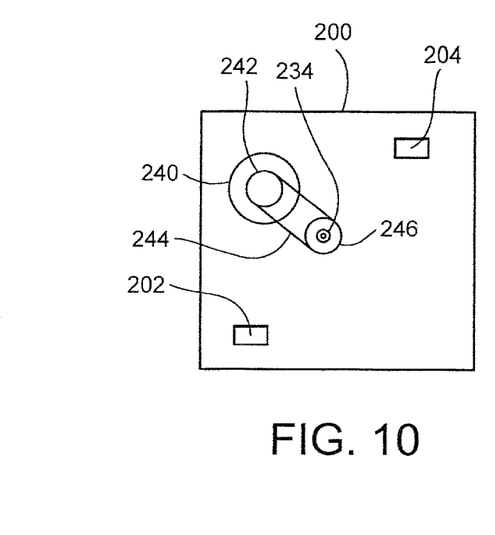
FIG. 10 is a front view of a switching unit which includes a motorized switching device.

In other embodiments, a power device could be used to move the switching plate 230 between the horizontal and vertical orientations. FIG. 10 illustrates an embodiment in which an electric motor 240 is coupled to a drive belt 244 via a pulley 242. The drive belt 244 is also attached around a pulley 246 which is attached to a rotational axis of the switching plate 230. As a result, rotation of the motor 240 will cause the switching plate 230 to rotate between the horizontal and vertical orientations.

Note, in some embodiments, the switching plate 230 could be moved 90 degrees clockwise, and then 90 degrees counterclockwise to switch the switching plate 230 back and forth between the horizontal and vertical orientations. In other embodiments, the switching plate could simply be rotated clockwise 90 degrees at a time to move the switching plate between the vertical and horizontal orientations.

In alternate embodiments, a different type of powered switching means could be used to cause the switching plate to move between the vertical and horizontal orientations. The motor illustrated in FIG. 10 is only one non-limiting embodiment. For instance, the switching unit could be a rack and pinion arrangement, a hydraulically or pneumatically operated piston arrangement, a linear motor arrangement, or any other type of device which can be used to impart rotational motion, as is well known to those skilled in the art.

Moreover, the switching units illustrated in FIGS. 3, 4 and 7-10 are all rectilinear units having square or rectangular switching plates. In alternate embodiments, the switching unit could take on a variety of other forms. Regardless of the specific form of the switching unit, however, the switching unit should preferably be capable of switching the heated and cooled air output by a heating and cooling unit between the upper vents in a room and the lower vents in a room.

Figure 11:
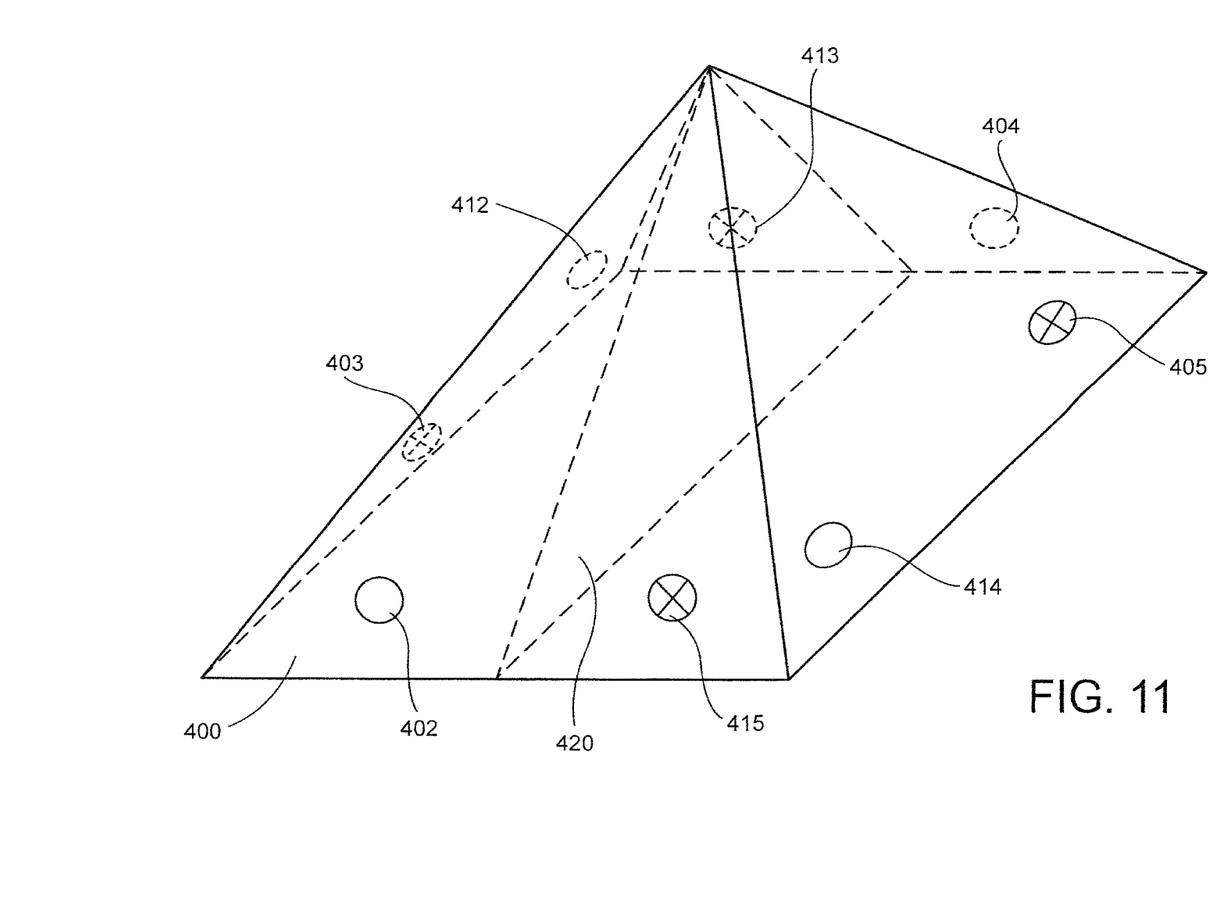
FIG. 11 is a perspective view of a pyramid-shaped switching unit.
Figure 12A:
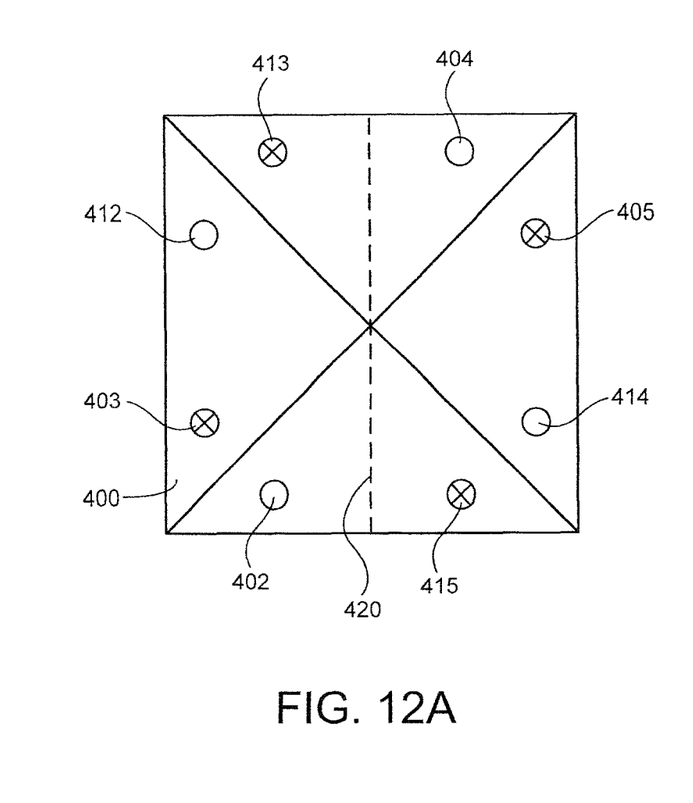
FIGS. 12A and 12B are top views of the pyramid-shaped switching unit of FIG. 11 with the switching plate in two different positions.
Figure 12B:
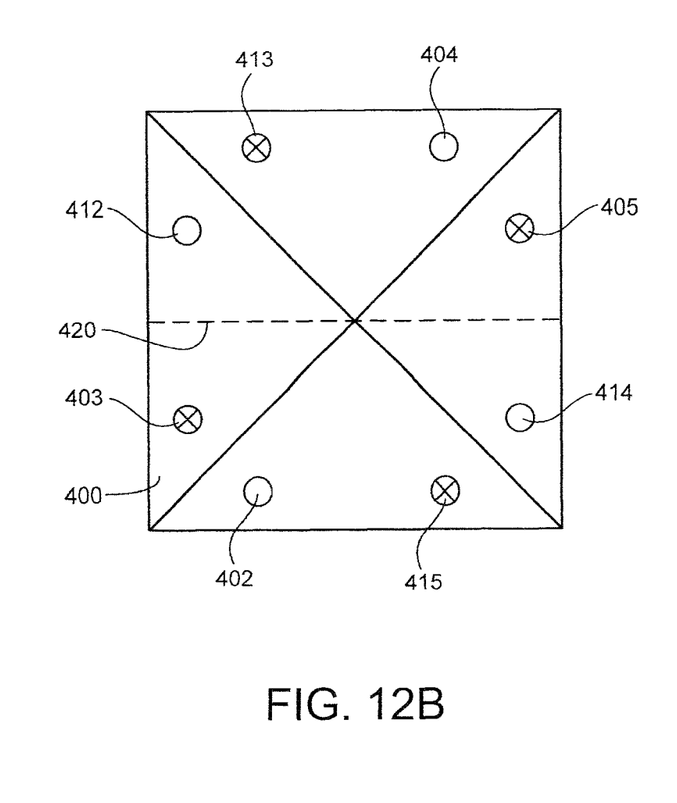

FIG. 11 is a perspective view of a pyramid-shaped switching unit which could also be used in a system embodying the invention. As illustrated in FIG. 11, a triangular-shaped switching plate 420 is rotationally mounted within the triangular-shaped switching unit 400. FIGS. 12a and 12b illustrate a top view of the triangular-shaped switching unit 400 shown in FIG. 11. In FIG. 12a, the switching plate 420 is oriented in a first position. In FIG. 12b, the switching plate 420 has been rotated 90 degrees so that it is oriented in the second position.

The triangular-shaped switching unit includes an input port 402, and an output port 404. In addition, the triangular-shaped switching unit includes a first I/O port 412 and a second I/O port 414.

When the triangular-shaped switching plate 420 is oriented as shown in FIG. 12a, heated or cooled air entering in an interior of the switching unit through the input port 402 would be communicated to the first I/O port 412. Likewise, air returning from rooms of a building entering the switching unit through the second I/O port 414 would be communicated to the output port 404.

When the switching plate 420 is rotated to the position shown in FIG. 12b, the input port 402 would be connected to the second I/O port 414. Also, the first I/O port 412 would be connected to the output port 404.

As also illustrated in FIGS. 11, 12a and 12b, the input port, output port and first and second I/O ports could be located at alternate locations. For instance, the input port 402 could also be located at the position marked with reference numeral 403. The output port 404 could also be located at the alternate position identified with reference numeral 405. The first I/O port 412 could be located at the alternate position 413. Further, the second I/O port 414 could be located at the alternate position 415.

Furthermore, as explained above, two input ports could be provided at locations 402 and 403, and two output ports could be located at positions 404 and 405. Likewise, two first I/O ports could be located at positions 412 and 413, and two second I/O ports could be located at positions 414 and 415.

Figure 13:
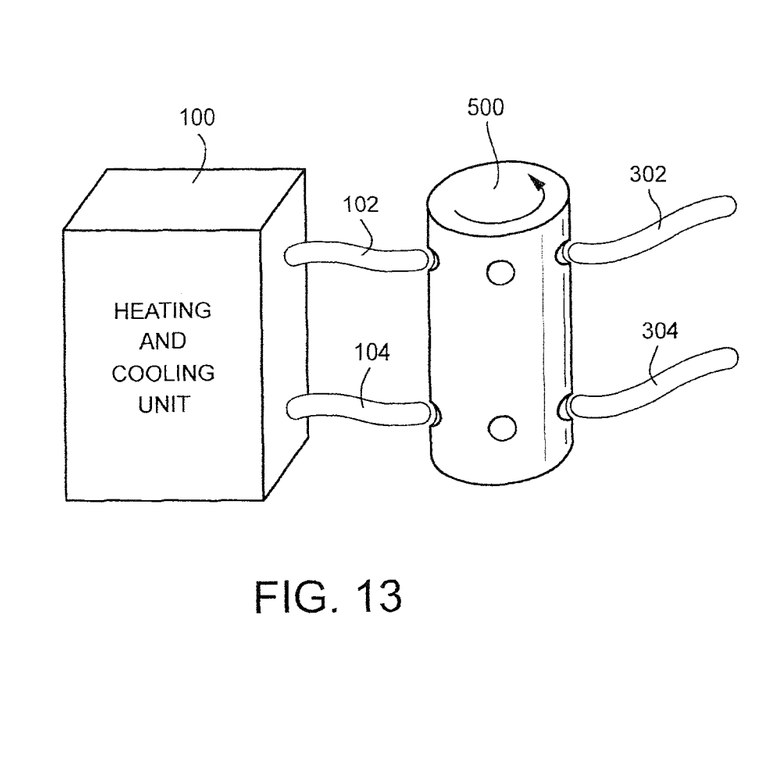
FIG. 13 is a diagram of a cylindrical-shaped switching unit coupled to a heating and cooling unit.
Figure 14A:
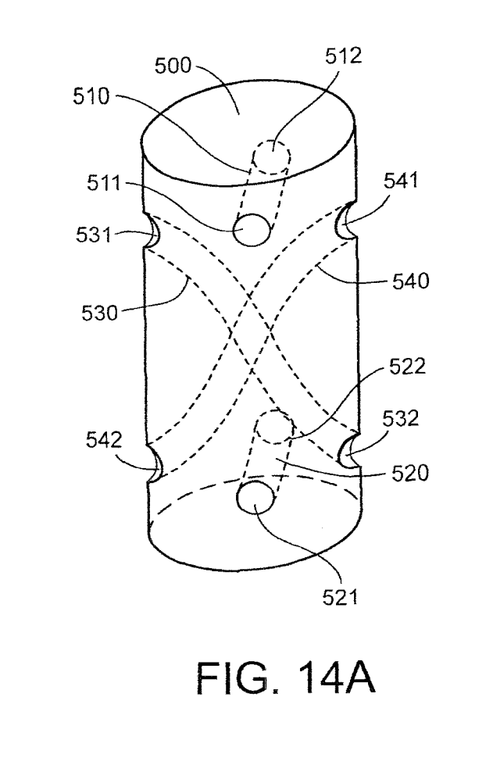
FIG. 14A is a perspective view of the core of the cylindrical-shaped switching unit of FIG. 13.

FIG. 13 illustrates the use of a cylindrical-shaped switching unit in a heating and cooling system embodying the invention. The cylindrical switching unit 500 has a cylindrical shaped core 502, as illustrated in FIG. 14A, mounted inside a cylindrical outer shell. The cylindrical core 502 is rotated 90 degrees inside the outer shell to change how the output vent 102 and input vent 104 are coupled to an upper duct 302 and a lower duct 304.

FIG. 14a shows a perspective view of the core 502 of the cylindrical switching unit 500 illustrated in FIG. 13. As shown in FIG. 14a, the cylindrical core 502 includes an upper horizontal duct 510 passing between two upper horizontal ports 511, 512. The core also includes a lower horizontal duct 520 passing between two lower horizontal ports 521, 522. When the core 502 is rotated so that the upper horizontal port 511 is connected to the output duct 102, the opposite upper horizontal port 512 would be connected to the upper duct 302. Further, the lower horizontal port 521 would be connected to the duct 104, and the opposite lower horizontal port 522 would be connected to the lower duct 304.

When the core 502 of the switching unit is rotated 90 degrees, the upper and lower horizontal ducts 510, 520 would no longer be in registration with the upper duct 302, lower duct 304, or the ducts 102 and 104 passing to the heating and cooling unit 100. Instead, a first vertical duct 530 would connect the output duct 102 to the lower duct 304 passing to the building. Also, the second vertical duct 540 would connect the upper duct 302 from the building to the input duct 104 passing into the heating and cooling unit.

Figure 14B:
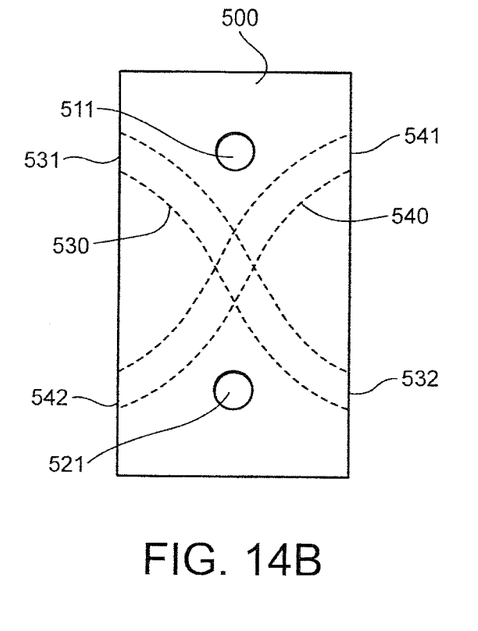
FIG. 14B is a front view of the cylindrical-shaped core of the switching unit of FIG. 14A.
Figure 14C:
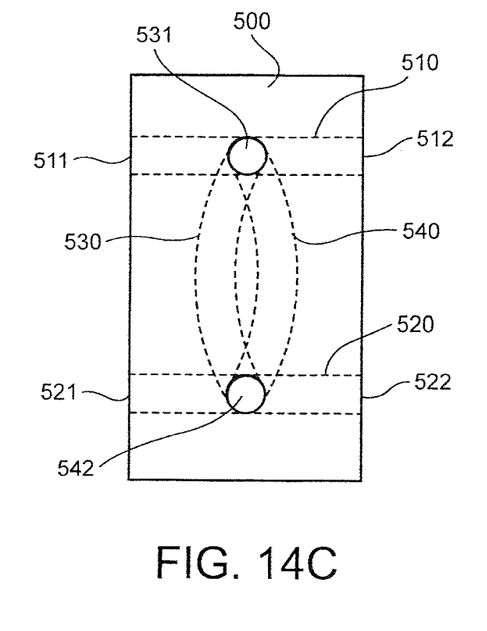
FIG. 14C is a left side view of the cylindrical-shaped core of the switching unit of FIG. 14A.

FIG. 14B presents a front view of the core 502 of the cylindrical-shaped switching unit, and FIG. 14C presents a left side view of the core 502 of the cylindrical switching unit 500. FIGS. 14B and 14C are provided to better illustrate the connections provided by the horizontal ducts 510 and 520, and the vertical ducts 530 and 540.

In the description provided above, it was assumed that the heating and cooling unit 100 would provide both heated air during a heating operation and cooled air during a cooling operation. In alternate embodiments, the heating and cooling unit 100 might only include a heater, or it might only include an air conditioning unit. For instance, if a building is located in a warm climate area, there would be no need for the building to include a heater. Instead, the building would only have an air conditioning unit. Likewise, if a building is located in a cool climate area, the building might only include a heater, and it would not have an air conditioning unit. Benefits of the above-described systems could also be obtained by buildings having only a heater or only an air conditioner.

If a building includes only a heater, the switching unit would be set into the heating mode when the heater is being operated to provide heated air into the rooms of the building. If, on a particular day, the outside temperature becomes unusually warm, it would be possible to set the switching unit into the cooling mode, and then run the system with just a fan to circulate air. Although the air provided into the rooms of the building would not be cooled by the heating and cooling unit 100, the air would still circulate. And the movement of cooler air at the bottom of each room towards the top of each room, resulting from the airflow caused when the switching unit is in the cooling mode, would still serve to better distribute the cool air in the rooms. Thus, some benefit would be provided by operating the system in the cooling mode, with just a fan running, even though no air conditioning unit is cooling the air passing through the heating and cooling unit 100.

Likewise, if a building only includes an air conditioning unit, the switching unit would be set into the cooling mode when the air conditioning unit is running. If a particular day is unusually cool, the switching unit could be switched to the heating mode, and the air could simply be circulated with a fan. Although no heater would heat the air passing through the heating and cooling unit 100, simply moving the air in the heating mode would serve to better distribute the warmer air at the tops of the rooms down towards the bottoms of each room. Thus, some benefit would be obtained from running the system in the heating mode with just a fan.

In view of the foregoing, the inventors believe that a system as described above can be beneficial even for buildings that have only a heater or only an air conditioning unit.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A switching unit for an environmental control system of a building, comprising:
   a rectilinear enclosure;
   an inlet located on an upper portion of a first sidewall of the enclosure and opening into an interior of the enclosure;
   an outlet located on a lower portion of the first sidewall of the enclosure and opening into the interior of the enclosure;
   a first I/O port located on an upper portion of a second sidewall of the enclosure that is opposite the first sidewall, the first I/O port opening into the interior of the enclosure;
   a second I/O port located on a lower portion of the second sidewall of the enclosure and opening into the interior of the enclosure; and
   a flat switching plate that is rotatably mounted inside the enclosure, the switching plate being rotatable between first and second positions, wherein when the switching plate is in the first position, the inlet is operatively coupled to the first I/O port and the outlet is operatively coupled to the second I/O port, and wherein when the switching plate is in the second position, the inlet is operatively coupled to the second I/O port and the outlet is operatively coupled to the first I/O port.

2. The switching unit of claim 1, wherein the flat switching plate is substantially square or rectangular, and wherein side edges of the switching plate abut interior sides of walls of the rectilinear enclosure when the switching plate is in the first and second positions.

3. The switching unit of claim 2, wherein the switching plate is oriented substantially horizontal when in the first position, and wherein the switching plate is oriented substantially vertical in the second position.

4. The switching unit of claim 3, wherein the inlet and the outlet are located diagonally opposite one another on the first sidewall, and wherein the first I/O port and the second I/O port are located diagonally opposite one another on the second sidewall.

5. The switching unit of claim 4, wherein the inlet and the second I/O port are located closer to a front wall of the rectilinear enclosure than a rear wall of the rectilinear enclosure, and wherein the outlet and the first I/O port are located closer to the rear wall than the front wall.

6. The switching unit of claim 1, wherein the inlet and the second I/O port are located closer to a front wall of the rectilinear enclosure than a rear wall of the rectilinear enclosure, and wherein the outlet and the first I/O port are located closer to the rear wall than the front wall.

7. The switching unit of claim 6, wherein when the switching plate is located in the first position, the inlet and the first I/O port are operatively coupled together and the outlet and the second I/O port are operatively coupled together.

8. The switching unit of claim 7, wherein when the switching plate is located in first position, side edges of the switching plate abut interior sides of the first and second sidewalls, the front wall and the rear wall of the rectilinear enclosure to isolate the inlet and the first I/O port from the outlet and the second I/O port.

9. The switching unit of claim 6, wherein when the switching plate is located in the second position, the inlet and the second I/O port are operatively coupled together and the outlet and the first I/O port are operatively coupled together.

10. The switching unit of claim 9, wherein when the switching plate is located in second position, side edges of the switching plate abut interior sides of the first and second sidewalls, a top wall and a bottom wall of the rectilinear enclosure to isolate the inlet and the second I/O port from the outlet and the first I/O port.

11. The switching unit of claim 1, further comprising a switch unit that moves the switching plate between the first and second positions.

12. The switching unit of claim 11, wherein the switch unit comprises a manually operable lever or knob that is operatively coupled to the switching plate.

13. The switching unit of claim 11, wherein the switch unit comprises a power operated unit that is configured to automatically move the switching plate between the first and second positions depending on an operational state of an environmental control system incorporating the switching unit.

14. The switching unit of claim 1, wherein the switching plate rotates around an axis that passes through centers of the first and second sidewalls.

15. A switching unit for an environmental control system of a building, comprising:
a rectilinear enclosure that can be divided horizontally into upper and lower hemispheres or divided vertically into front and rear hemispheres;
an inlet located on a first sidewall of the enclosure and opening into an interior of the enclosure;
an outlet located on the first sidewall of the enclosure and opening into the interior of the enclosure;
a first I/O port located on a second sidewall of the enclosure that is opposite the first sidewall, the first I/O port opening into the interior of the enclosure;
a second I/O port located on the second sidewall of the enclosure and opening into the interior of the enclosure; and
a flat switching plate that is rotatably mounted inside the enclosure, wherein the inlet and the first I/O port are located on the upper hemisphere of the enclosure, wherein the outlet and the second I/O port are located on the lower hemisphere of the enclosure, wherein the inlet and the second I/O port are located on the front hemisphere of the enclose, and wherein the outlet and the first I/O port are located on the rear hemisphere of the enclosure.

16. The switching unit of claim 15, wherein the switching plate is rotatable between first and second positions, wherein when the switching plate is in the first position, the inlet is operatively coupled to the first I/O port and the outlet is operatively coupled to the second I/O port, and wherein when the switching plate is in the second position, the inlet is operatively coupled to the second I/O port and the outlet is operatively coupled to the first I/O port.

17. The switching unit of claim 16, wherein the switching plate is substantially square or rectangular, and wherein side edges of the switching plate abut interior sides of walls of the rectilinear enclosure when the switching plate is in the first and second positions.

18. The switching unit of claim 17, wherein the switching plate is oriented substantially horizontal when in the first position, and wherein the switching plate is oriented substantially vertical in the second position.

19. The switching unit of claim 18, wherein the inlet and the outlet are located diagonally opposite one another on the first sidewall, and wherein the first I/O port and the second I/O port are located diagonally opposite one another on the second sidewall.

20. The switching unit of claim 19, wherein when the switching plate is located in the first position, side edges of the switching plate abut interior sides of the first and second sidewalls, a front wall and a rear wall of the rectilinear enclosure to isolate the inlet and the first I/O port from the outlet and the second I/O port.

21. The switching unit of claim 20, wherein when the switching plate is located in second position, side edges of the switching plate abut interior sides of the first and second sidewalls, a top wall and a bottom wall of the rectilinear enclosure to isolate the inlet and the second I/O port from the outlet and the first I/O port.

22. The switching unit of claim 15, wherein the switching plate rotates around an axis that passes through centers of the first and second sidewalls.

* * * * *